United States Patent
Johnson et al.

(10) Patent No.: US 10,317,966 B2
(45) Date of Patent: Jun. 11, 2019

(54) VOLTAGE REGULATION AUTO-TUNING BY DETECTING ACTUAL TOTAL CAPACITANCE AT OUTPUT TERMINAL

(71) Applicant: DELL PRODUCTS, L.P., Round Rock, TX (US)

(72) Inventors: Ralph H. Johnson, Round Rock, TX (US); Shiguo Luo, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 254 days.

(21) Appl. No.: 15/228,986

(22) Filed: Aug. 4, 2016

(65) Prior Publication Data

US 2018/0039309 A1    Feb. 8, 2018

(51) Int. Cl.
| | |
|---|---|
| *H02M 1/00* | (2006.01) |
| *H02M 1/08* | (2006.01) |
| *H02M 1/32* | (2007.01) |
| *H02M 3/335* | (2006.01) |
| *G06F 1/26* | (2006.01) |

(52) U.S. Cl.
CPC ............... *G06F 1/26* (2013.01); *H02M 1/08* (2013.01); *H02M 1/32* (2013.01); *H02M 3/33507* (2013.01); *H02M 2001/0009* (2013.01)

(58) Field of Classification Search
CPC . G06F 1/26; H02M 1/08; H02M 1/32; H02M 1/36; H02M 2001/0009; H02M 3/33507
See application file for complete search history.

(56) References Cited

U.S. PATENT DOCUMENTS

| 5,959,441 | A   | 9/1999 | Brown |
| 7,898,234 | B1  | 3/2011 | Lash et al. |
| 8,786,268 | B2  | 7/2014 | Li et al. |
| 2001/0007417 | A1* | 7/2001 | Kitagawa ............ H02J 7/0068 320/128 |
| 2010/0127670 | A1* | 5/2010 | Chen ................... H02J 7/0081 320/163 |
| 2014/0285167 | A1  | 9/2014 | Audy et al. |
| 2015/0355698 | A1  | 12/2015 | Luo et al. |
| 2016/0111957 | A1  | 4/2016 | Mathew et al. |
| 2016/0181921 | A1  | 6/2016 | Zhang et al. |

FOREIGN PATENT DOCUMENTS

WO    2010149234 A1    12/2010

\* cited by examiner

*Primary Examiner* — Terrell S Johnson
(74) *Attorney, Agent, or Firm* — Isidore PLLC (57) ABSTRACT

A voltage regulation (VR) module of an Information Handling System (IHS) operates a switching direct current to direct current (DC-DC) voltage regulation (VR) power circuit in a constant current mode at a constant current level. The VR module approximates the capacitance value of the output capacitive load at the output terminal of the switching DC-DC VR power circuit based upon a time interval for output voltage to reach a threshold. The VR module then operates the switching DC-DC power circuit in constant output voltage mode using one group of VR operating settings to optimize performance for the capacitance value of the output capacitive load.

20 Claims, 5 Drawing Sheets

VOLTAGE REGULATION AUTO-TUNING BY DETECTING ACTUAL TOTAL CAPACITANCE AT OUTPUT TERMINAL

BACKGROUND

1. Technical Field

The present disclosure generally relates to power components of an information handling system, and more particularly to voltage regulators and methods for controlling such voltage regulators in an information handling system.

2. Description of the Related Art

As the value and use of information continues to increase, individuals and businesses seek additional ways to process and store information. One option available to these users is an information handling system (IHS). An IHS generally processes, compiles, stores, and/or communicates information or data for business, personal, or other purposes thereby allowing users to take advantage of the value of the information. Because technology and information handling needs and requirements vary between different users or applications, IHSs may vary with respect to the type of information handled; the methods for handling the information; the methods for processing, storing or communicating the information; the amount of information processed, stored, or communicated; and the speed and efficiency with which the information is processed, stored, or communicated. The variations in IHSs allow for IHSs to be general or configured for a specific user or specific use such as financial transaction processing, airline reservations, enterprise data storage, or global communications. In addition, IHSs may include or comprise a variety of hardware and software components that may be configured to process, store, and communicate information and may include one or more computer systems, data storage systems, and networking systems.

One challenge with computer systems as well as other electrical devices is providing power to the various components of the computer system within the varied voltage tolerance ranges required by those components. Power is usually supplied to a computer system from an alternating current (AC) source and converted to a direct current (DC) power by an AC to DC converter. DC power can also be supplied from a battery source as well. The DC output of a converter or battery source is then regulated by a DC regulator to provide DC power within specified tolerances.

One type of DC voltage regulator is a pulse width modulated "buck" regulator. Buck regulators typically include a switch in the form of a transistor in series with an unregulated DC power source. Connected to the other side of the switch is an inductor-capacitor (LC) circuit and diode. An oscillating circuit switches on and off the transistor to periodically provide current to the LC circuit from the unregulated DC power source. The LC circuit smoothes out the modulated current from the DC power source to provide an essentially ripple-free DC voltage. The longer that the switching transistor is switched on, the higher the DC voltage is at the output of the LC circuit. The regulator usually includes a feedback circuit to control the amount of time that the switching transistor is turned on and correspondingly, the amount of current provided to the transistor from the DC power source.

Often a voltage regulator (VR) is used in a system that is highly configurable. The VR may provide power to memory modules, for example, that place an amount of capacitance across an output voltage terminal of the VR. The amount of capacitance can be significantly different depending on the type of memory modules or whether a particular memory module has changed in capacitance during its service life.

BRIEF SUMMARY

According to at least one aspect of the present disclosure, an information handling system (IHS) includes a switching direct current to direct current (DC-DC) voltage regulator (VR) power circuit that produces a regulated output voltage and regulated output current at an output terminal. An output capacitive load having a capacitance value is connected between the output terminal and a ground terminal. A controller is provided in electrical communication with the switching DC-DC VR power circuit to regulate an output voltage value. The controller: (i) operates the switching DC-DC VR power circuit in a constant current mode at a first current level; (ii) determines a first time interval between the output voltage increasing from a first threshold to a second threshold; (iii) approximates the capacitance value of the output capacitive load based upon the first time interval; (iv) identifies one group of VR operating settings associated with the approximate capacitance value; and (v) operates the switching DC-DC power circuit in constant output voltage mode using the one group of VR operating settings to optimize performance for the capacitance value of the output capacitive load.

According to at least one aspect of the present disclosure, a method is provided for switching DC-DC VR for an IHS. The method includes operating, by a controller, a switching direct current to DC-DC VR power circuit in a constant current mode at a first current level, and determining a first time interval between the output voltage increasing from a first threshold to a second threshold. The method includes approximating a capacitance value of an output capacitive load at an output terminal of the switching DC-DC VR power circuit based upon the first time interval. The method includes identifying one group of VR operating settings associated with the approximate capacitance value. The method includes operating the switching DC-DC power circuit in constant output voltage mode using the one group of VR operating settings to optimize performance for the capacitance value of the output capacitive load.

According to at least one aspect of the present disclosure, a VR module of an IHS is provided for switching DC-DC voltage regulation. A switching DC-DC VR power circuit produces a regulated output voltage and regulated output current at an output terminal that is connected to an output capacitive load having a capacitance value. A controller is provided in electrical communication with the switching DC-DC VR power circuit to regulate an output voltage value at the output terminal. The controller: (i) operates the switching direct current to DC-DC VR power circuit in a constant current mode at a first current level, (ii) determines a first time interval between the output voltage increasing from a first threshold to a second threshold; (iii) approximates the capacitance value of the output capacitive load at the output terminal of the switching DC-DC VR power circuit based upon the first time interval; (iv) identifies one group of VR operating settings associated with the approximate capacitance value; and (v) operates the switching DC-DC power circuit in constant output voltage mode using the one group of VR operating settings to optimize performance for the capacitance value of the output capacitive load.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments of the present disclosure provide an Information Handling System (IHS) having a switching DC-DC voltage regulator (VR) that performs a control method to (i) detect actual total capacitance at a VR output terminal and then (ii) complete VR control optimization including key parameter auto-tuning such as over current protection (OCP) level and nonlinear control for any possible load configuration. This method: (a) ensures system stability and optimum performance for a given load configuration; (b) prevents OCP mis-trigger due to excessive charge current for output capacitors; and (c) optimizes critical nonlinear and dynamic control parameters.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
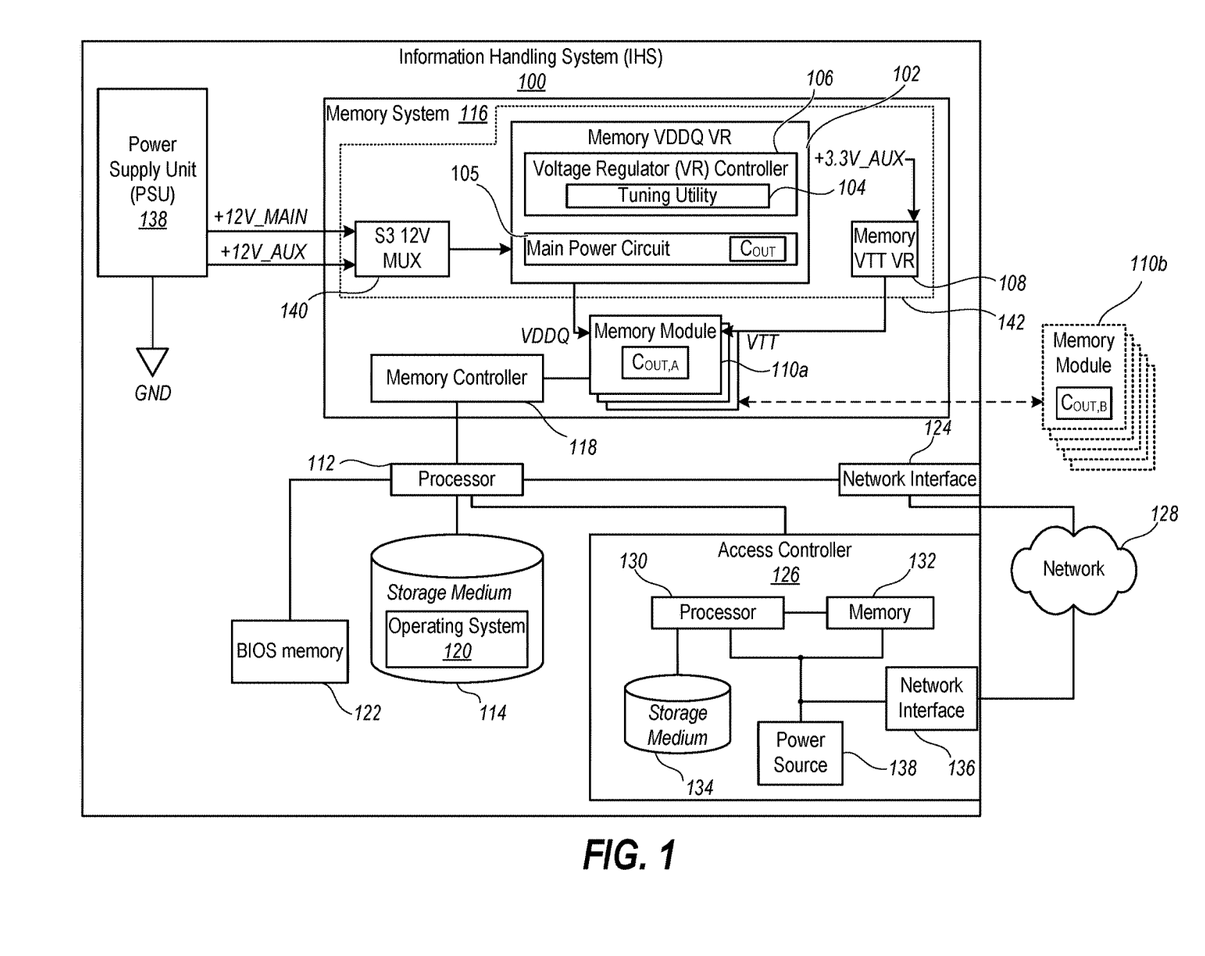
FIG. 1 illustrates a block diagram of an information handling system (IHS) that includes a switching direct current to direct current (DC-DC) voltage regulator (VR) for supplying power to a memory system, according to one or more embodiments.

FIG. 1 illustrates a two-dimensional block diagram representation of an example of an IHS 100 having a voltage regulator (VR) controller 102 that has a total output capacitance ($C_{OUT}$) tuning utility 104 that detects and optimizes for total $C_{out}$ at an output terminal. VR controller 102 utilizes a power up phase to estimate $C_{OUT}$ of a capacitive load and capacitance at VR output terminal on a VR power circuit 105 controlled by the VR controller 102. For clarity, VR controller 102 is provided separate from VR power circuit 105; however, in one or more embodiments the VR controller 102 can be integral to the VR power circuit 105. In an illustrative embodiment, VR power circuit 105 includes a memory output stage drain power voltage (VDDQ) VR 106 and memory VTT VR 108. VR controller 102 adjusts performance to the capacitive load. For example the capacitive load could be due to connecting a memory module 110a having a capacitive value of $C_{OUT,A}$. Alternatively, the capacitive load could be due to connecting a memory module 110b having a capacitive value of $C_{OUT,B}$. Memory modules 110a, 110b can also represent the same device having a changing capacitive value, such as due to degradation over time.

IHS 100 is an exemplary environment within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As depicted in FIG. 1, IHS 100 may include processor 112, memory system 110 communicatively coupled to processor 112, and storage medium 114 communicatively coupled to processor 112. Processor 112 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 112 may interpret and/or execute program instructions and/or process data stored and/or communicated by one or more of memory system 116, memory controller 118, and/or another component of IHS 100. Processor 112 may be coupled to other components (not shown) with optional interfaces (I/Fs) via a PCIe (Peripheral Component Interconnect Express) interface, for example.

Memory system 116 may be communicatively coupled to processor 112 and may comprise any system, device, or apparatus operable to retain program instructions or data for a period of time (e.g., computer-readable media). For example without limitation, memory system 116 may comprise RAM, EEPROM, a PCMCIA card (Personal Computer Memory Card International Association standard conformant expansion card), flash memory, magnetic storage, opto-magnetic storage, or any suitable selection and/or array of volatile or non-volatile memory that retains data after power to IHS 100 is turned off. In particular embodiments, memory system 110 may comprise dynamic random access memory (DRAM).

Memory system 116 may include memory controller 118 and one or more memory modules 110a communicatively coupled to memory controller 118. Memory controller 118 may be any system, device, or apparatus configured to manage and/or control the memory system 116. For example, memory controller 118 may be configured to read data from and/or write data to memory module(s) 110a comprising memory system 116. Additionally or alternatively, memory controller 118 may be configured to refresh memory module(s) 110a in embodiments in which memory system 116 comprises DRAM or another type of volatile memory. Although memory controller 118 is shown in FIG. 1 as an integral component of memory system 116, memory controller 118 may be separate from memory system 116 and/or may be an integral portion of another component of IHS 100 (e.g., memory controller 118 may be integrated into processor 112). Each memory module(s) 110a may include a DRAM module (e.g., a dual in-line package (DIP) memory, a Single In-line Pin Package (SIPP) memory, a Single Inline Memory Module (SIMM), a Ball Grid Array (BGA), or any other suitable memory.

Storage medium 114 may be communicatively coupled to processor 112. Storage medium 114 may include any system, device, or apparatus operable to store information processed by processor 112. Storage medium 114 may include, for example, network attached storage, one or more direct access storage devices (e.g., hard disk drives), and/or one or more sequential access storage devices (e.g., tape drives). As shown in FIG. 1, storage medium 114 may have stored thereon an operating system (OS) 120. OS 120 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 120. Active portions of OS 120 may be transferred to memory system 116 for execution by processor 112.

A basic input/output system (BIOS) memory 122 may be included in or be separate from the memory system 116. A flash memory or other nonvolatile memory may be used as the BIOS memory 122. A BIOS program (not expressly shown) may typically be stored in the BIOS memory 122. The BIOS program may include software that facilitates interaction with and between the IHS devices such as a keyboard (not expressly shown), a mouse (not expressly shown), and/or one or more I/O devices. BIOS memory 122 may also include UEFI (Unified Extensible Firmware Interface) or BIOS (basic input/output system) firmware that store system code (note expressly shown) operable to control a plurality of basic IHS operations. IHS 100 may operate by executing BIOS for a system firmware in response to being powered up or reset. BIOS may identify and initialize components of IHS 100 and cause an operating system to be booted.

As depicted in FIG. 1, IHS 100 may also include network interface 124 communicatively coupled to processor 112, and an access controller 126 coupled to processor 112. Network interface 124 may include any suitable system, apparatus, or device operable to serve as an interface between IHS 100 and network 128. Network interface 124 may enable IHS 100 to communicate over network 128 using any suitable transmission protocol and/or standard, including without limitation all transmission protocols and/or standards with respect to the discussion of network 128. In certain embodiments, network interface 124 may be configured with hardware, software, and/or firmware to allow its associated IHS 100 to boot from a computer-readable medium remote from IHS 100 (e.g., a computer-readable medium coupled to network interface 124 via network 128).

Access controller 126 may be any system, device, apparatus or component of IHS 100 configured to permit an administrator or other person to remotely monitor and/or remotely manage IHS 100 (e.g., via an IHS remotely connected to IHS 100 via network 128) regardless of whether IHS 100 is powered on and/or has an operating system installed thereon. In certain embodiments, access controller 126 may allow for "out-of-band" control of IHS 100, such that communications to and from access controller 126 are communicated via a management channel physically isolated from the "in band" communication with network interface 124. Thus, for example, if a failure occurs in IHS 100 that prevents an administrator from remotely accessing the IHS 100 via network interface 124 (e.g., operating system failure, power failure, etc.), the administrator may still be able to monitor and/or manage the IHS 100 (e.g., to diagnose problems that may have caused failure) via access controller 126. In the same or alternative embodiments, access controller 126 may allow an administrator to remotely manage one or more parameters associated with operation of IHS 100 (e.g., power usage, processor allocation, memory allocation, security privileges, etc.). In certain embodiments, access controller 126 may include or may be a Baseboard Management Controller (BMC), a Management Engine (ME), or an integral part of a Dell Remote Access Controller (DRAC) or an Integrated Dell Remote Access Controller (iDRAC).

As depicted in FIG. 1, access controller 126 may include processor 130, memory 132 communicatively coupled to processor 130, storage media 134, network interface 136 communicatively coupled to processor 130, and power source 138 electrically coupled to processor 130. Processor 130 may include any system, device, or apparatus configured to interpret and/or execute program instructions and/or process data, and may include, without limitation a microprocessor, microcontroller, digital signal processor (DSP), Application Specific Integrated Circuit (ASIC), or any other digital or analog circuitry configured to interpret and/or execute program instructions and/or process data. In some embodiments, processor 130 may interpret and/or execute program instructions and/or process data stored in memory 132 and/or another component of IHS 100.

Memory 132 may be communicatively coupled to processor 130 and may include any system, device, or apparatus configured to retain program instructions and/or data for a period of time (e.g., computer-readable media). By way of example without limitation, memory 132 may include RAM, EEPROM, a PCMCIA card, flash memory, magnetic storage, opto-magnetic storage, or any suitable selection and/or array of volatile or non-volatile memory that retains data after power to IHS 100 is turned off or power to access controller 126 is removed. Network interface 136 may include any suitable system, apparatus, or device operable to serve as an interface between access controller 126 and network 128. Network interface 136 may enable the access controller 126 to communicate over network 128 using any suitable transmission protocol and/or standard, including without limitation all transmission protocols and/or standards enumerated below with respect to the discussion of network 128.

The example IHS 100 can include a power supply unit (PSU) 138 that converts a main alternating current (AC) power supply to low-voltage regulated DC power used by switching DC-DC VRs. Certain components require additional voltage regulation to provide another voltage level or to maintain power characteristics within an acceptable range even for varying, bidirectional electrical loads. In accordance with one embodiment, FIG. 1 illustrates PSU 138 providing +12V_MAIN and +12V_AUX power via an S3 12V MUX 140 to a memory VR system 142 that supports memory system 116. Memory VDDQ VR 106 provides VDDQ to memory module(s) 106 and memory VTT-VR 108 provides VTT to memory module(s) 110*a*.

In certain embodiments, IHS 100 may comprise a computer chassis or enclosure (e.g., a server chassis holding one or more server blades). In other embodiments, IHS 100 may be a personal computer (e.g., a desktop computer or a portable computer).

Figure 2:
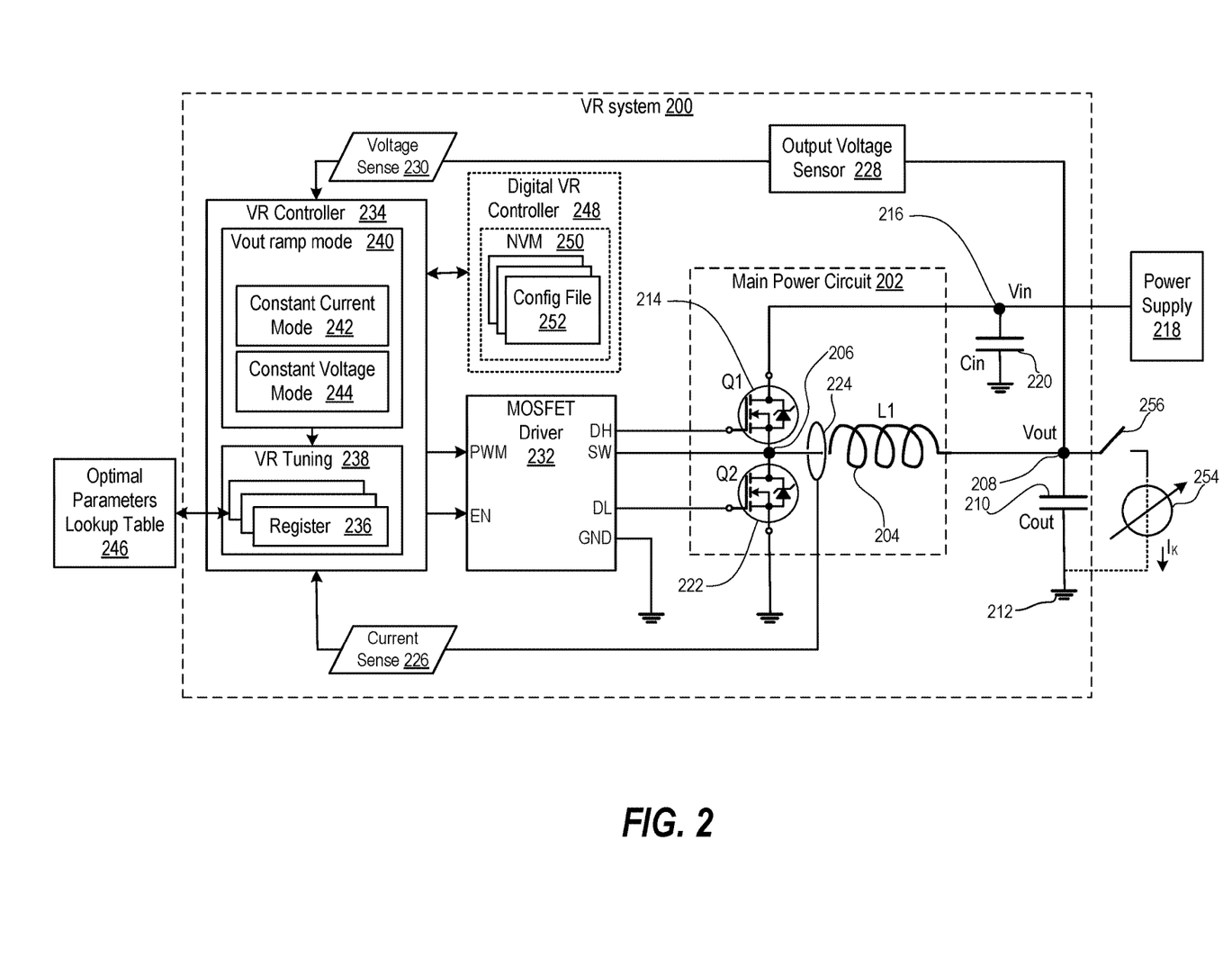
FIG. 2 illustrates a block diagram of a switching DC-DC VR for the IHS of FIG. 1, according to one or more embodiments.

FIG. 2 illustrates a switching DC-DC VR 200 for tuning suitable to a capacitive value of a capacitive load that can be utilized within an IHS, such as IHS 100 (FIG. 1). A main power circuit 202 is illustrated as including a synchronous Buck circuit, which includes an inductor (L1) 204 electrically connected between a phase node 206 and an output node 208. A capacitor (Cout) 210 is electrically connected between the output node 208 and ground (GND) 212. A high side control switch (HS) 214, such as an n-channel metal-oxide semiconductor field effect transistor (MOSFET) ("Q1"), is electrically connected between an input voltage ($V_{IN}$) terminal 216 from power supply 218 and the phase node 206. An input capacitor ($C_{IN}$) 220 is connected between input voltage terminal 216 and GND 212. A low side synchronous switch (LS) 222, such as n-channel MOSFET ("Q2"), is electrically connected between GND 212 and phase node 206. A load current sensor 224 senses the load current value (current sense 226) by either (a) inductor DC resistance (DCR) method or (b) LS drain-to-source resistance (Rdson) method. An output voltage sensor 228 is electrically connected across the output node 208 and GND 212 to detect an output voltage value (voltage sense 230). HS 214 and LS 222 are switched by a MOSFET driver 232 having a switch (SW) output connected to phase node 206, a drive high (DH) output connected to the gate of HS 214, a drive low (DL) output connected to the gate of the LS 222, and a GND output connected to GND 212. MOSFET driver 232 performs the switching of HS 214 and LS 222 in response to pulse width modulation (PWM) input and an Enable (EN) input provided by VR controller 234. Pulse width is modulated by the VR controller so that VR output can be regulated to target reference voltage.

VR controller 234 is placed in electrical connection with HS 214 and LS 222 via MOSFET driver 232. VR controller 234 is directly in electrical connection with load current sensor 224 and output voltage sensor 228. VR controller 234 receives and/or transmits signals to/from these components to regulate the output voltage value across the output capacitor 210 by switching on and off HS 214 and LS 222 to cause an inductor current ripple through the inductor 204. Given the various transfers of signals and information, for purposes of the disclosure, VR controller 234 is described as being in electrical communication with these various components. In one embodiment, VR controller 234 detects the load current value and the voltage output value of the main power circuit 202. VR controller 234 select optimal parameters to optimize the control performance according to values in registers 236 that are adjusted according to the present innovation to accommodate a range of output capacitance values by using VR tuning module 238. In particular, VR controller 234 can utilize a period of charging the output capacitor 210 by utilizing an output voltage (Vout) ramp mode component 240 first operating in a constant current mode 242 to ramp up the output voltage before reverting to constant voltage mode 244. In one or more embodiments, appropriate values for registers 236 can be obtained from a lookup table 246 containing optimal parameters for the corresponding portion of the range of output capacitance values. In one or more embodiments, digital VR controller 248 in communication with VR controller 234 has nonvolatile memory (NVM) 250 containing more than one configuration file 252. Each configuration file 252 is appropriate for a particular portion of the range of output capacitance value. Any variable external load 254 to the main power circuit 202 can be disconnected by output switch 256 during output voltage ramp of the VR. Variable external load 254 can cause a leakage current $i_k$ during output voltage power ramp up.

IHSs typically include a number of electronic components that are sensitive to alterations in the voltage being supplied for the components to operate. Excessive positive or negative voltage surge events can cause catastrophic failure to the components. To provide appropriately regulated DC-DC voltage conversion for sensitive components, IHSs typically have a number of synchronous Buck VRs. For instance, a typical portable IHS can have synchronous Buck VRs providing different level voltage to components such as a central processing unit (CPU), I/O (Input/Output) Controller Hub (ICH), hard disk drive, and memory. Examples of memory components include double data rate type three (DDR3) and type 4 (DDR4) synchronous dynamic random access memory (SDRAM).

Each VR for a given platform is conventionally designed to support the worst case load configuration. However, a platform will typically support a wide range of possible configurations. For example, there are more than sixty (60) Dual In-line Memory Module (DIMM) configurations with memory cards that come from numerous vendors. Another example is that a customer may choose one hard disk (HDD) or up to twenty-four (24) HDDs. Optimization design for VR control is based on load characteristics, highly depending on VR output terminal inductor and capacitor as well as their values and distribution. The ideal buck converter output filter is described by the double pole resonant frequency as determined by the output L and C:

$$f = \frac{1}{2\pi\sqrt{LC}}$$

with a zero as determined by the output C and its Equivalent Series Resistance (ESR). Loop gain T for the buck converter system can be expressed by an equation for a compensator with 2 poles and 2 zeroes and a buck converter transfer function:

$$T = \frac{\omega_m}{S} \cdot \frac{\left(1+\frac{S}{\omega_{Z1}}\right)\left(1+\frac{S}{\omega_{Z2}}\right)}{\left(1+\frac{S}{\omega_{P1}}\right)\left(1+\frac{S}{\omega_{P2}}\right)} \cdot \frac{\left(1+\frac{S}{\omega_Z}\right)}{\left(1+\frac{S}{Q\omega_0}+\left(\frac{S}{\omega_0}\right)^2\right)}$$

One objective for controller design is to implement a compensator with proper gain and pole and zero placement to shape the loop gain, T, for stability and optimum performance for given power stage parameters, input voltage, Pulse Width Modulation (PWM) gain, Inductance (L), Capacitance (C), and bandwidth (Q factor). However, decoupling capacitors of a given load configuration may be very different from that of the worst-case control optimization design. Therefore, VR control design will no longer be optimized or may even be unstable when total actual capacitance of a given load configuration does not match the designed for configuration of the VR in a certain range. Various double data rate fourth generation (DDR4) dual in-line memory module (DIMM) types across different manufacturers returns a large range of per DIMM capacitance.

Control loop characteristic will vary as configuration changes. One DIMM configuration can make higher bandwidth (BW) but less phase margin and gain margin. As the VDD (power supply voltage) capacitance is increased, the BW of the loop response decreases.

For a multi-phase digital VR controller, there are other critical control modes such as nonlinear control and dynamic voltage identification (DVID) control for which performance is highly relying on given capacitance. These controls are optimized against the worst configuration and load characteristics. Therefore, one time VR optimization for one specific condition cannot guarantee optimal VR operation for mismatched configurations and operating conditions.

Returning to FIG. 2, during system power-up, the VR 200 is enforced to operate in constant current mode. Based on measured VR output current, Imon, capacitance may be calculated by $$i(t) = C\frac{dv}{dt}.$$

Assuming there is no load, and output current (capacitor charging current) Ic is kept constant, the time duration in which the output voltage ramps up from V1 to V2 (delta V) may be timed by a digital controller, so that the capacitance may be approximated by:

$$c = \frac{Ic(T2-T1)}{V2-V1}$$

For example, the timer may start when Vout reaches 50% of preset regulated voltage and end at 80%. VR will then operate in regular voltage regulation mode after Vout passes 80% preset voltage. As shown in FIG. 2, there can be a leakage or residual load seen by the charging current provided by the VR 200 during start-up. In this case, the algorithm adds a second charge current during start-up. For each programmed charging current, $I_F$, there will be two measured $$\frac{dv}{dt}$$

values. With two equations and two unknowns, the load capacitance, C, and load leakage current, $I_K$, can be determined by the simultaneous solution of the following matrix:

$$\begin{bmatrix} C \\ I_K \end{bmatrix} = \begin{bmatrix} 1 & \frac{dv1}{dt} \\ \square & \frac{dv2}{dt} \end{bmatrix}^{-1} \begin{bmatrix} I_{f1} \\ I_{f2} \end{bmatrix}$$

where $\frac{dv1}{dt}$ is measured with forced charging current $I_{f1}$ and $$\frac{dv2}{dt}$$

is measured with forced charging current $I_{f2}$.

After determining output capacitance, VR 200 uploads optimal parameters or configuration file to match detected capacitance. After acquiring VR output capacitance information, there are two exemplary approaches to implement VR auto-tuning provided respectively as method 300 in FIG. 3 and method 400 in FIG. 4.

Figure 3:
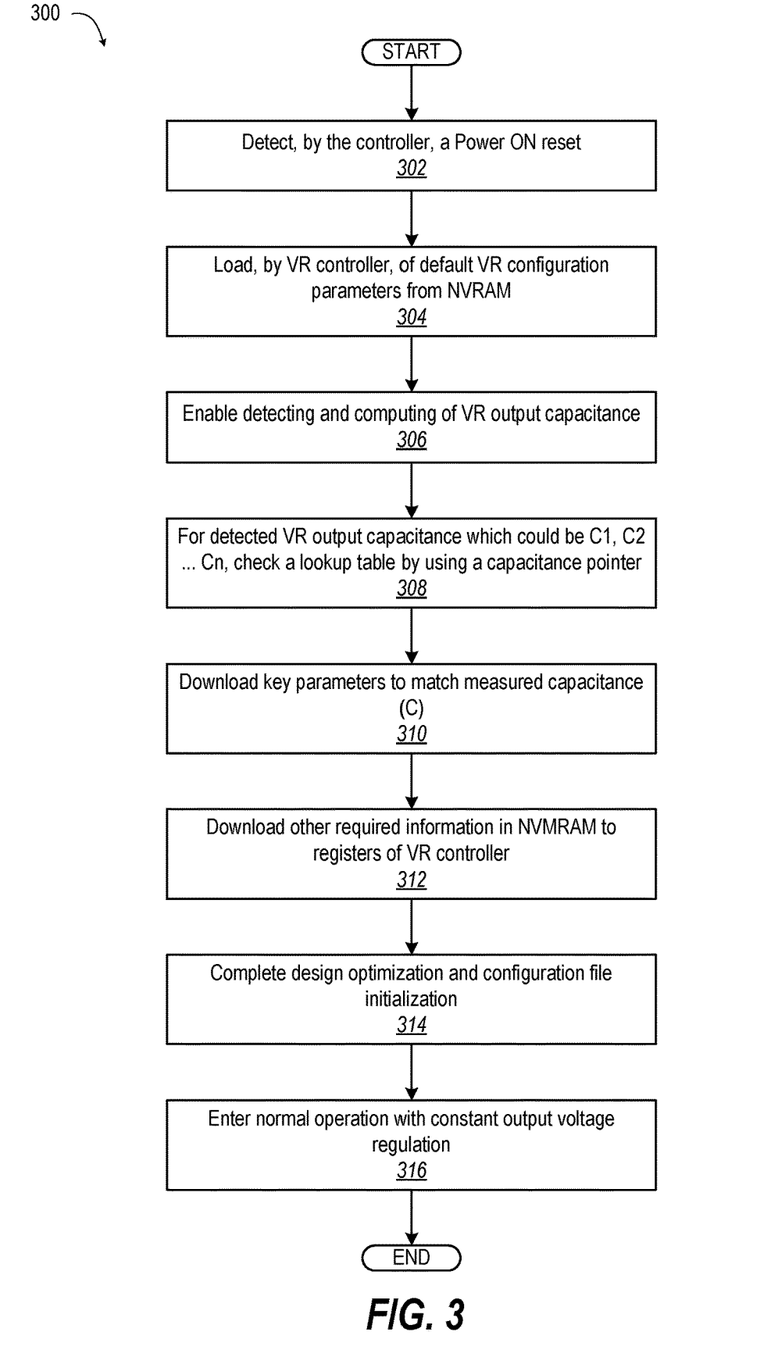
FIG. 3 illustrates a flow diagram of a method of uploading a pre-optimized set of parameters to appropriate registers from a lookup table, according to one or more embodiments.

With reference to FIG. 3, method 300 illustrates the use of multi-sets of optimal key parameters management, i.e., uploading pre-optimized set of parameters to appropriate registers by a lookup table. Key parameters may include but are not limited to (a) OCP threshold adjustment, (b) Loop Proportional-Integral-Derivative (PID) control parameters Ki, Kd, Kp, and (c) DVID control, nonlinear control parameters, etc. Method 300 includes detecting, by a VR controller, an output voltage ramp up period such as following a Power ON reset (block 302). Method 300 includes loading, by the controller, of default VR configuration parameters from NVRAM (block 304). Method 300 includes enabling detection and computation of VR output capacitance (block 306). Method 300 includes, for detected VR output capacitance, which could be C1, C2 . . . Cn, checking a lookup table by using a capacitance pointer (block 308). Method 300 includes downloading key parameters to match measured capacitance (C) (block 310). Method 300 includes downloading other required information in NVMRAM to registers of VR controller (block 312). With parameters loaded, method 300 includes completing design optimization and configuration file initialization (block 314). Then, method 300 includes entering normal operation with constant output voltage regulation (block 316).

Figure 4:
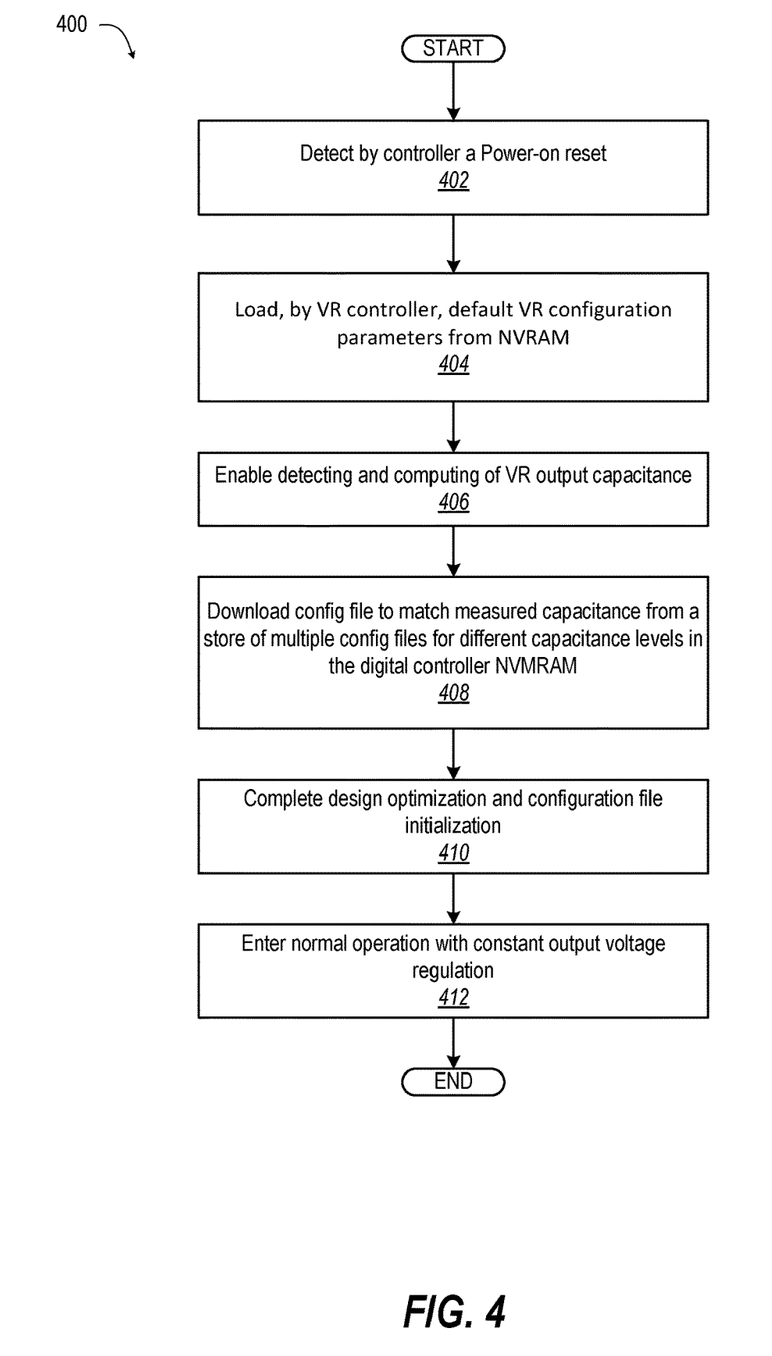
FIG. 4 illustrates a flow diagram of a method of selecting an appropriate configuration file from multiple configuration files, according to one or more embodiments.

FIG. 4 illustrates method 400 for managing multiple configuration files in order to load a matched configuration ("config") file. The matched config file is located in a lookup table using detected capacitance value as a pointer. Method 400 includes detecting, by VR controller, a Power ON reset (block 402). Method 400 includes loading, by the controller, of default VR configuration parameters from NVRAM (block 404). Method 400 includes enabling detection and computation of VR output capacitance (block 406). Method 400 includes downloading config file to match measured capacitance from a store of multiple config files for different capacitance levels in the digital controller NVMRAM (block 408). With config file loaded, method 400 includes completing design optimization and configuration file initialization (block 410). Then, method 400 includes entering normal operation with constant output voltage regulation (block 412).

Figure 5:
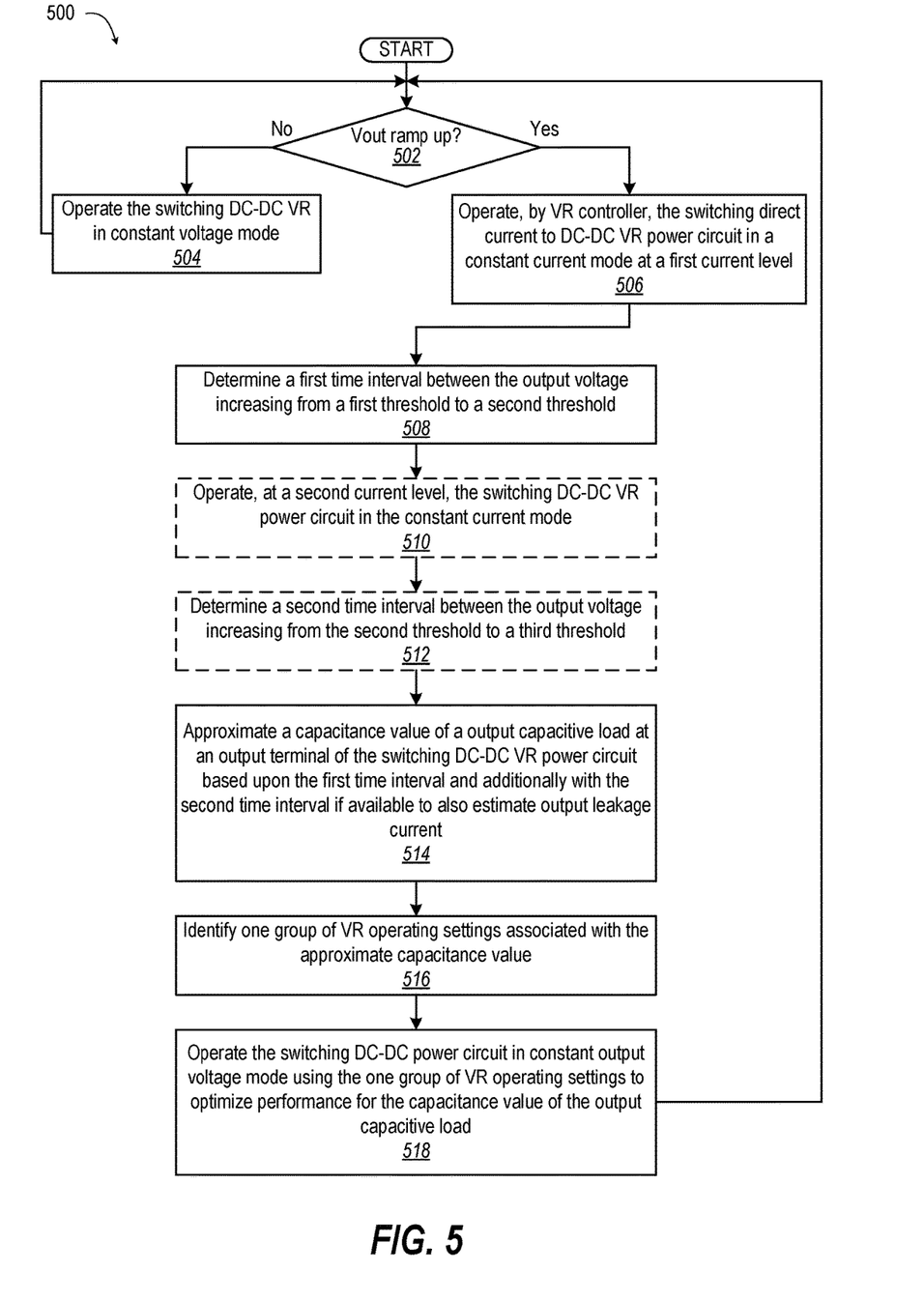
FIG. 5 illustrates a flow diagram of a method of controlling a switching DC-DC VR, according to one or more embodiments.

FIG. 5 provides a method for switching DC-DC VR for an IHS. In one or more embodiments, method 500 includes determining, by a VR controller, whether at least a portion of the IHS that receives electrical power from the switching DC-DC VR power circuit is in the output voltage rail power-up mode ("Vout ramp up") (decision block 502). In response to determining that the at least a portion of the IHS that receives electrical power from the switching DC-DC VR power circuit is not in power-up mode in decision block 502, method 500 includes operating the switching DC-DC VR in constant voltage mode (block 504). Method 500 returns to decision block 502 to continue monitoring for power-up mode. In response to determining that the at least a portion of the IHS that receives electrical power from the switching DC-DC VR power circuit is in power-up mode in decision block 502, method 500 includes operating, by VR controller, the switching direct current to DC-DC VR power circuit in a constant current mode at a first current level (block 506). Method 500 includes determining a first time interval between the output voltage increasing from a first threshold to a second threshold (block 508). In one or more embodiments, method 500 includes operating, at a second current level, the switching DC-DC VR power circuit in the constant current mode (block 510). Method 500 includes determining a second time interval between the output voltage increasing from the second threshold to a third threshold (block 512). Method 500 includes approximating a capacitance value of an output capacitive load at an output terminal of the switching DC-DC VR power circuit. The approximation is based upon the first time interval and may additionally be based on the second time interval if available to also estimate output leakage current (block 514). Method 500 includes identifying one group of VR operating settings associated with the approximate capacitance value (block 516). Method 500 then includes operating the switching DC-DC power circuit in constant output voltage mode using the one group of VR operating settings to optimize performance for the capacitance value of the output capacitive load (block 518). Then method 500 returns to block 502 to monitor for power-up mode.

In the above described flow charts of FIGS. 3-5, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An Information Handling System (IHS) comprising:
   a switching direct current to direct current (DC-DC) voltage regulation (VR) power circuit producing a regulated output voltage and regulated output current at an output terminal;
   an output capacitive load connected between the output terminal and a ground terminal and having a capacitance value;
   a controller in electrical communication with the switching DC-DC VR power circuit to regulate an output voltage value, wherein the controller:
      operates the switching DC-DC VR power circuit in a constant current mode at a first current level;
      determines a first time interval between the output voltage increasing from a first threshold to a second threshold;
      approximates the capacitance value of the output capacitive load based on the first time interval;
      identifies one group of VR operating settings associated with the approximate capacitance value; and
      changes operation of the switching DC-DC power circuit to operate in constant output voltage mode using the one group of VR operating settings to optimize performance for the capacitance value of the output capacitive load.

2. The IHS of claim 1, further comprising a voltage sensor electrically connected to the output terminal to measure the regulated output voltage.

3. The IHS of claim 1, further comprising a current sensor electrically connected to the output terminal to measure the regulated output current.

4. The IHS of claim 1, wherein the controller:
   determines whether at least a portion of the IHS that receives electrical power from the switching DC-DC VR power circuit is in an output voltage power rail ramp mode; and
   in response to determining that the at least a portion of the IHS that receives electrical power from the switching DC-DC VR power circuit is in an output voltage power rail ramp mode, optimizes performance for the capacitive load during power up of the switching DC-DC VR power circuit.

5. The IHS of claim 1, wherein the controller:
   operates, at a second current level, the switching DC-DC VR power circuit in the constant current mode;
   determines a second time interval between the output voltage increasing from the second threshold to a third threshold; and
   approximate the capacitance value of the output capacitive load and a leakage current of the output capacitive load based on the first and second time intervals.

6. The IHS of claim 1, further comprising a storage device having a data structure containing more than one group of VR operating settings, each group associated with a particular capacitive value of an output capacitive load on the output terminal.

7. The IHS of claim 6, wherein the data structure comprises a lookup table containing an optimized set of parameters stored in associated registers of the controller.

8. The IHS of claim 6, wherein the data structure comprises a lookup table pointing to more than one matched configuration file.

9. A method for switching direct current to direct current (DC-DC) voltage regulation (VR) for an Information Handling System (IHS), the method comprising:
   operating, by a controller, a switching direct current to DC-DC VR power circuit in a constant current mode at a first current level;
   determining a first time interval between the output voltage increasing from a first threshold to a second threshold;
   approximating a capacitance value of an output capacitive load at an output terminal of the switching DC-DC VR power circuit based on the first time interval;
   identifying one group of VR operating settings associated with the approximate capacitance value; and
   changing an operation of the switching DC-DC power circuit to operate in constant output voltage mode using the one group of VR operating settings to optimize performance for the capacitance value of the output capacitive load.

10. The method of claim 9, further comprising:
    determining whether at least a portion of the IHS that receives electrical power from the switching DC-DC VR power circuit is in a power rail ramp up mode; and
    in response to determining that the at least a portion of the IHS that receives electrical power from the switching DC-DC VR power circuit is in power rail ramp mode, optimizing performance for the capacitive load during power up of the switching DC-DC VR power circuit.

11. The method of claim 9, further comprising:
    operating, at a second current level, the switching DC-DC VR power circuit in the constant current mode;
    determining a second time interval between the output voltage increasing from the second threshold to a third threshold; and
    approximating the capacitance value of the output capacitive load and a leakage current of the output capacitive load based on the first and second time intervals.

12. The method of claim 9, wherein identifying the one group of VR operating settings further comprises accessing a storage device having a data structure containing more than one group of VR operating settings, each group associated with a particular capacitive value of an output capacitive load on the output terminal.

13. The method of claim 12 wherein the data structure comprises a lookup table containing an optimized set of parameters stored in associated registers of the controller.

14. The method of claim 12, wherein the data structure comprises a lookup table pointing to more than one matched configuration file.

15. A voltage regulation (VR) module of an Information Handling System (IHS), the VR module comprising:
- a switching direct current to direct current (DC-DC) voltage regulation (VR) power circuit producing a regulated output voltage and regulated output current at an output terminal that is connected to an output capacitive load having a capacitance value; and
- a controller in electrical communication with the switching DC-DC VR power circuit to regulate an output voltage value at the output terminal, wherein the controller:
  - operates the switching direct current to DC-DC VR power circuit in a constant current mode at a first current level;
  - determines a first time interval between the output voltage increasing from a first threshold to a second threshold;
  - approximates the capacitance value of the output capacitive load at the output terminal of the switching DC-DC VR power circuit based on the first time interval;
  - identifies one group of VR operating settings associated with the approximate capacitance value; and
  - changes an operation of the switching DC-DC power circuit to operate in constant output voltage mode using the one group of VR operating settings to optimize performance for the capacitance value of the output capacitive load.

16. The VR module of claim 15, wherein the controller:
- determines whether at least a portion of the IHS that receives electrical power from the switching DC-DC VR power circuit is in an output voltage power rail ramp mode; and
- in response to determining that the at least a portion of the IHS that receives electrical power from the switching DC-DC VR power circuit is in power rail ramp mode, optimizes performance for the capacitive load during power up of the switching DC-DC VR power circuit.

17. The VR module of claim 15, wherein the controller:
- operates, at a second current level, the switching DC-DC VR power circuit in the constant current mode;
- determines a second time interval between the output voltage increasing from the second threshold to a third threshold; and
- approximates the capacitance value of the output capacitive load and a leakage current of the output capacitive load based on the first and second time intervals.

18. The VR module of claim 15, wherein the controller identifies the one group of VR operating settings by accessing a storage device having a data structure containing more than one group of VR operating settings, each group associated with a particular capacitive value of an output capacitive load on the output terminal.

19. The VR module of claim 18, wherein the data structure comprises a lookup table containing an optimized set of parameters stored in associated registers of the controller.

20. The VR module of claim 18, wherein the data structure comprises a lookup table pointing to more than one matched configuration file.

* * * * *